United States Patent [19]

Donnelly

[11] Patent Number: 4,823,640
[45] Date of Patent: Apr. 25, 1989

[54] BALANCED-REACTION VARIABLE-RATIO TRANSMISSION

[76] Inventor: Richard J. Donnelly, 522 21st St., Santa Monica, Calif. 90402-3034

[21] Appl. No.: 109,416

[22] Filed: Oct. 19, 1987

[51] Int. Cl.$^4$ .................... F16H 47/04; F16H 37/06
[52] U.S. Cl. ........................................ 74/687; 74/682
[58] Field of Search ................. 74/687, 682, 681, 664

[56] References Cited

U.S. PATENT DOCUMENTS

| | | | |
|---|---|---|---|
| 2,808,737 | 10/1957 | Bullard III | 74/687 |
| 2,830,468 | 4/1958 | Waring | 74/687 |
| 2,914,965 | 12/1959 | Matz | 74/687 |
| 2,917,948 | 12/1959 | Nussbaumer | 74/687 |
| 2,972,905 | 2/1961 | Bullard III | 74/681 |
| 3,023,638 | 3/1962 | Westbury et al. | 74/687 |
| 3,204,486 | 9/1965 | DeLalio | 74/687 |
| 3,455,183 | 7/1969 | Orshansky | 74/687 |
| 3,470,769 | 10/1969 | Livezey | 74/720.5 |
| 3,869,939 | 3/1975 | Miyao | 74/687 |
| 4,354,400 | 10/1982 | Baker | 74/687 |
| 4,690,016 | 9/1987 | Whalen | 74/687 |

FOREIGN PATENT DOCUMENTS

| | | | |
|---|---|---|---|
| 2463335 | 3/1981 | France | 74/687 |
| 2482692 | 11/1981 | France | 74/687 |

*Primary Examiner*—Dirk Wright
*Assistant Examiner*—Harold F. Macris
*Attorney, Agent, or Firm*—J. E. McTaggart

[57] ABSTRACT

Variable-ratio transmission configurations are derived from a basic balanced-reaction configuration which is known to operate with inherently lower power flow in the reactive path for a given ratio range than the more common split-input or split-output configurations. A pair of planetary gear sets having different base speed ratios, are configured to each provide a power transmission path from the input shaft to the output shaft while the reaction gear elements are cross-coupled to each other through an auxiliary variable ratio power-transfer device. A particular two-planetary-set configuration uses the ring gear elements as the reactors, one mounted to rotate around the input shaft and the other mounted to rotate around the output shaft. The ring gears are thus readily coupled to an auxiliary variable ratio power-transfer device, which may be a pair of hydraulic pump/motors. For extended ratio range, three or more (n) differential gear sets are configured in parallel input-/output power paths, to be selected in pairs in (n−1) different ratio ranges for connection through automatic hydraulic or clutch-type range-switching means acting in the reaction power paths. In a "nested" configuration for superior overall power efficiency resulting from reduced reaction path power losses, a first, high power two-differential-set balanced-reaction transmission utilizes in its reaction path a second, medium power two-differential-set balanced reaction transmission, so that the power-handling requirements of the second transmission's variable ratio power-transfer device may be made very low.

11 Claims, 4 Drawing Sheets

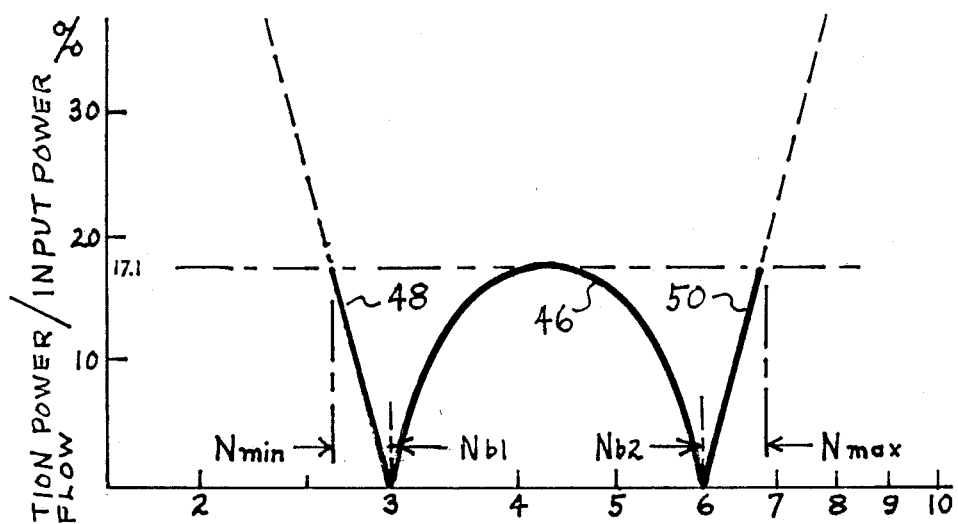
FIG. 3 N = TRANSMISSION RATIO: RPM$_{in}$/RPM$_{out}$
PRIOR ART
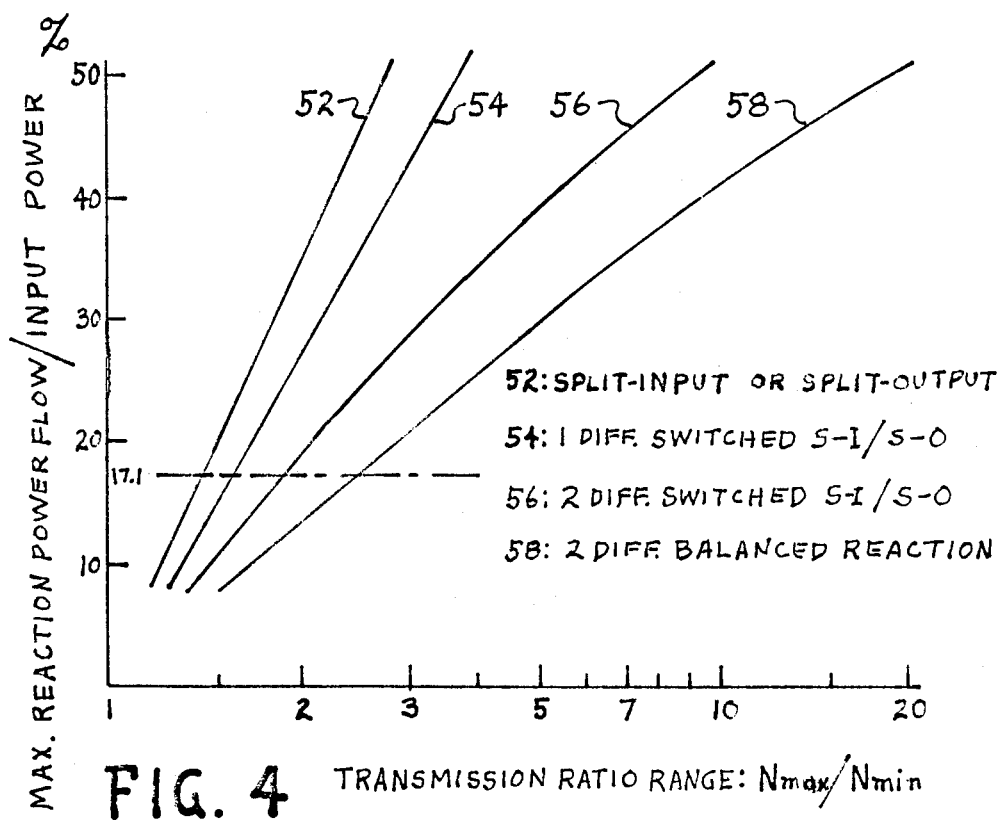
FIG. 4 TRANSMISSION RATIO RANGE: N$_{max}$/N$_{min}$
PRIOR ART

BALANCED-REACTION VARIABLE-RATIO TRANSMISSION

FIELD OF THE INVENTION

This invention relates to the field of automatic transmissions for matching rotational mechanical power sources to varying loads, and more particularly it relates to high-efficiency transmissions having a wide range of continuously-variable rotational speed ratio, especially suitable for but not limited to motor vehicles.

BACKGROUND OF THE INVENTION

Prior Art

Since the introduction of motor vehicles, the market demand for automatic transmissions has grown strong due to their obvious user benefits over the standard manual gearshift/pedal clutch transmission.

Despite extensive development efforts in the automatic transmission field, state-of-the-art automatic transmissions, which rely largely on multi-stage synchronous clutch shifting between various mechanical/hydraulic power split modes, remain substantially less efficient and more costly than standard manual gearshifts, and frequently suffer from a marginal level of uneven shifting characteristics as well as reliabilty and serviceability shortcomings, due in part to high complexity.

Paradoxically, standard manual gearshifts, which demand a wide variation of engine speed at each shift, remain substantially superior to automatic gearshifts in efficiency and fuel economy, even though a truly continuously-variable automatic transmission has the potential of equalling and even surpassing the fuel economy of manual gearshifts, especially under stop-and-go driving conditions, by keeping the engine speed constant during vehicle acceleration, provided the power losses normally associated with the hydraulic portion of automatic transmissions are reduced to a low level.

The great majority of known automatic transmissions are based on the principle of an elementary split type hydromechanical subsystem comprising a differential (usually planetary) gear set interposed between the input and output shafts, with its reaction gear element (reactor) coupled through an auxiliary bilateral variable-ratio device, typically a hydraulicly-coupled pair of variable-stroke hydrostatic motor-pumps, to either the transmission's input shaft or its output shaft, thus splitting the power flow, at either the input or the output, into a mechanical branch in which power is transferred through the two main gear elements of the planetary set, and a hydraulic branch in which a portion of the power flows into or out from the reactor gear element of the planetary set, through the variable-ratio device.

This basic subsystem is highly efficient at a base speed ratio, when the reactor is in effect locked against rotation and all of the power is transferred through the mechanical branch; however, at ratios other than the base ratio, with the reactor rotating, the portion of the total input power routed through the hydraulic branch increases and associated power losses increase with increasing separation between the base ratio and the actual operating ratio selected. For example, a total transmission ratio range of 2 requires ½ of the input power to flow through the hydraulic branch at each end of the range. This power flow entails appreciable power loss, depending on the efficiency of the hydraulic device. Generally the gear trains in the mechanical branch are highly efficient, so practically all power losses are attributable to the hydraulic branch.

Such power loss, along with practical limits in fluid pressure and power-handling capacity of the hydraulic branch, limit the range of speed and torque conversion so severely that in transmissions for motor vehicles it has been necessary to provide a plurality of such subsystems in progressive modes of differing input/output speed ratios, using combinations of clutches, gear trains, hydraulic control valves and other devices, to shift between the various modes and to uncouple the unused elements in a particular mode.

In U.S. Pat. No. 2,830,468, Waring discloses a transmission having an auxiliary variable-ratio device with its first shaft coupled to the reactor of an epicyclic gear train (planetary gear set), and its second shaft coupled to either the transmission's input or its output, as selected by means of a complementary pair of clutches synchronized to shift between split-input and split-output modes at zero reactor rotation speed. The Waring patent is particulary concerned with avoiding operation in power-regenerative operating modes where feedback power could circulate and increase losses and power-handling requirements to abnormal levels. Accordingly, the predominant principle and intent taught in Waring's patent is to clutch-shift the transmission into a split-input configuration for ratios below the base ratio, and into a split-output configuration for ratios above the base ratio, so that the transmission is never allowed to operate in other modes which depend on regenerative power feedback.

A two-mode hydromechanical transmission, shifting between a split-input and a split-output mode, is disclosed by Miyao et al in U.S. Pat. No. 3,869,939, employing a complementary pair or quartet of synchronized clutches to override the differential action of one or other of a tandem pair of planetary gear sets having differing base ratios, and thus select either a split-input mode at a first base ratio or a split-output mode at a second base ratio, providing a wider range of speed ratios than the Waring patent by allowing the system to operate in a power-regenerative condition over a portion of the total range.

An example of a multi-mode hydromechanical approach, utilizing combinations of the basic subsystems and general principles outlined above, is seen in U.S. Pat. No. 3,455,183 to Orshansky, in which three planetary gear sets, up to six synchronous clutch means and one or two dual hydraulic motor-pump variable-ratio devices are combined by gear and shaft means and commanded by control means including multiple cam-operated valves in hydraulic fluid lines, to enable automatic shifting between several progressive modes having different ratios and different power path configurations which may be entirely mechanical or split into a mechanical and a hydraulic branch at either the input or output shaft depending on the mode selected.

In the development of prior art automatic transmissions, a major issue involving a great deal of development effort has been the problem of mitigating unwanted shocks due to transient mechanical and hydraulic pressure gradients during the shifting transition between modes, especially under full load such as when accelerating a motor vehicle. For example, critical adjustments are required in synchronizing multiple mode-shifting clutches. Measures taken to smooth out these transitions to even a tolerable level are often less than fully successful in practice, and at best the most advanced multi-mode automatic transmissions represent a piecewise synthesized compromise which falls short of the ideal smooth performance potentially available from a clutchless automatic transmission operating over a single wide range of uniform continuously-variable ratio without range-shifting.

SUMMARY OF THE INVENTION

It is a primary object of the present invention to provide an automatic transmission in which the input/output rotational speed ratio may be continuously varied over an unusually wide range.

More particularly, it is an object to provide a novel configuration combining two conventional planetary gear sets and a conventional auxiliary variable-ratio power-transfer device, in a unique balanced-reaction configuration in which a substantially equal power exchange between the reactor gear elements of the two planetary gear sets achieves a continuous ratio range wider than that of conventional configurations utilizing an equivalent complement of basic elements.

It is a further object to eliminate the need for associated clutch means as utilized in conventional automatic transmissions to shift or switch between different ratios and discrete modes, such as direct, compound, split-input and/or split-output modes.

It is still a further object of the present invention to provide a variable-ratio transmission which maintains high efficiency over a wide working range of input/output speed ratios.

These and other objects have been accomplished in the novel balanced-reaction configuration of the present invention in which a pair of differential gear sets are operationally interposed in parallel power paths between an input shaft receiving power from a prime mover and an output shaft delivering power to a load. A balanced-reaction power-exchange and control path is formed by cross-coupling the auxiliary variable-ratio device between the reactors of the two differential gear sets, such that neither driveshaft of the variable-ratio device is rotationally coupled to the input or the output shaft of the transmission, as distinguished from prior art having one shaft of the auxiliary variable-speed device rotationally coupled to the input shaft or the output shaft, either directly, through a direct gear train or by clutch means.

BRIEF DESCRIPTION OF THE DRAWINGS

FIG. 3 is a graph showing the relative level of power flow in the auxiliary variable-ratio device as a function of varying tranmission ratio of a balanced-reaction transmission configured in accordance with this invention in its illustrative embodiment as shown in FIG. 1 and FIG. 2.

FIG. 4 is a graph showing the relative level of power flow in the auxiliary variable-ratio device as a function of transmission ratio range for several conventional transmission configurations and for the transmission of the present invention.

DETAILED DESCRIPTION

Figure 1:
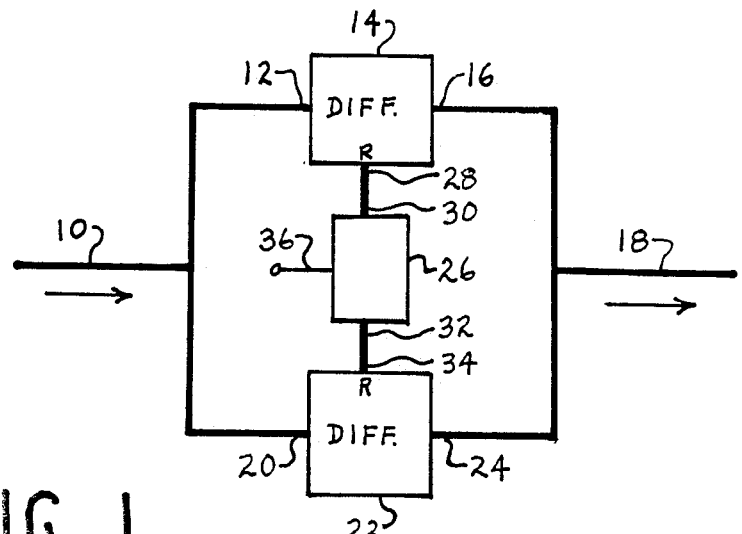
FIG. 1 is a simplified block diagram showing the basic power flow paths in a balanced-reaction variable-ratio transmission in accordance with the basic principles of the present invention.

Referring to FIG. 1, which is a block diagram of the power flow paths of the basic configuration of a balanced-reaction variable-ratio transmission in accordance with the present invention, an input shaft 10, which receives power from a prime mover, typically the engine of a motor vehicle, is rotationally coupled to an input gear element 12 of a differential unit 14 whose output gear element 16 is rotationally coupled to output shaft 18 which drives a work load, typically the main driveshaft driving the wheels of a motor vehicle. Input shaft 10 is also rotationally coupled to input gear element 20 of a second differential unit 22, whose output gear element 24 is rotationally coupled to output shaft 18. The reaction gear element (reactor) 28 of first differential unit 14 is rotationally coupled to shaft 30 of an auxiliary variable-ratio power-transfer device 26, whose second shaft 32 is rotationally coupled to reactor 34 of second differential unit 22. Variable-ratio device 26 is provided with a control input 36. This configuration forms an H-shaped power flow network having two parallel primary mechanical paths for transferring power from the input shaft 10 to the output shaft 18, the first path through the first differential unit 14 and the second path through the second differential unit 22. In addition power may flow in either direction through the auxiliary variable-ratio device 26, in the cross-coupled path betweeen reactors 28 and 34.

Figure 2:
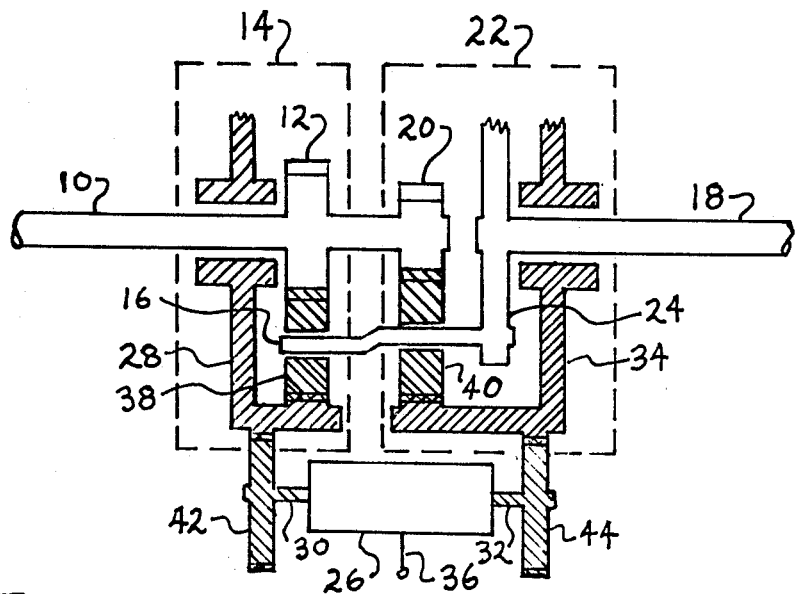
FIG. 2 is a functional cross-sectional diagram of a balanced reaction variable-ratio transmission configured in accordance with the basic principles of this invention in an illustrative embodiment. Dashed functional block outlines relate to FIG. 1.

FIG. 2 is a cross-sectional functional diagram of a transmission as it may be implemented in an illustrative embodiment of the present invention. The dashed outlines shown correspond with the functional blocks shown in FIG. 1.

Differential units 14 and 22 are configured as planetary gear sets. In the first planetary set 14, sun gear 12 on input shaft 10 serves as the input gear element, engaging pinions 38 (only one shown) of planet carrier 16 which serves as the first planetary's output gear element, rotationally coupled to output shaft 18 through attachment to planet carrier 24 of second planetary set 22. Input shaft 10 also drives sun gear 20 which serves as the input gear element of the second planetary set 22. Sun gear 20 engages pinions 40 (only one shown) of planet carrier 24, which, attached to output shaft 18, serves as the output gear element of second planetary set 22.

The auxiliary variable-ratio power-transfer device 26, controlled at input 36, has a first shaft 30 fitted with gear 42, in engagement with external teeth on ring gear 28, which, engaged through internal teeth with with pinions 38 of planet carrier 16, serves as the reaction gear element of first planetary set 14. Variable-ratio device 26 has a second shaft 32 fitted with gear 44, in engagement with external teeth on ring gear 34, which, engaged through internal teeth with pinions 40 of planet carrier 24, serves as the reaction gear element of the second planetary set 22.

For analysis, Nb is defined as the base ratio of a differential unit; that is, its input/output rotational speed ratio with its reactor stopped. If the effective internal diameter of ring gear 14 is made twice the effective diameter of sun gear 12, it can be calculated that the base ratio of first planetary set 14, Nb1=1+(ring diameter/sun diameter) =3: the transmission will have a 3:1 input/output ratio with reactor ring 28 stopped. Similarly if the diameter of ring gear 34 is made five times the diameter of sun gear 22, the base ratio of the second planetary, Nb2=6: the transmission will have a 6:1 ratio with reactor ring 34 stopped.

The transmission may be made to operate at either of these base ratios by commanding the variable-ratio device 26 to hold one reactor at zero rotation while allowing the other reactor to run free. In that condition, no power is transferred through the variable-ratio device 26 since one of its shafts has zero torque while the other has zero rotation speed, thus when operating at either base ratio, all of the input power is transmitted to output shaft 18 through one of the planetary sets, either 14 or 22, and no power is transferred through the variable-ratio device 26.

The transmission ratio may be varied to other values by controlling the variable-ratio device 26, through control input 36, to transfer power (product of torque times angular velocity) from shaft 30 to shaft 32 or vice versa, causing the input power flow to be divided between sun gears 12 and 20, and the output power flow to be divided between planet carriers 16 and 24, the input power-flow-split ratio being inversely related to the output-power-flow split ratio, as determined by the power flow in the cross-coupled path through the variable-ratio device 26 in an amount and direction required for the particular speed ratio N, as commanded by control input 36. Ideally the amount of power received at one shaft of device 26 from one of the reactors is to be balanced by an equal amount of power delivered by the other shaft to the other reactor; it is the role of the variable-ratio device and its control system to realize this ideal as nearly as possible.

The rotation equation for each of the planetary gear sets is:

$$RPMout = RPMin/Nb + RPMreactor/(1 - 1/Nb)$$

From this equation, power equality in accordance with the law of conservation of energy, and the constant torque relationship between the three gear elements of each planetary, there is a unique algebraic solution for each speed ratio N, yielding rotational velocity, torque, and power in each of the power paths shown in FIG. 1. Initially the analysis may be simplified by disregarding power losses.

FIG. 3 shows graphically the relative level of reaction-branch power flow through the variable-ratio device 26, as the transmission ratio N is varied throughout a range including Nb1 and Nb2, as computed in accordance with the previous paragraph.

It is seen from curve 46 in FIG. 3 that within the 2:1 range between Nb1 and Nb2, the power flow reaches a maximum of 17.1% of the total input power at a midpoint; at this point the transmission ratio N is the mean value between Nb1 and Nb2. Thus if it is assumed the variable-ratio device 26 operates at 80% efficiency, the overall efficiency of the transmission at this worst case ratio is 96.6% (since the losses are 20% of 17.1%: 3.4% of the input power), assuming negligibly small power loss in the highly efficient differential gear units 14 and 22.

It is also seen in FIG. 3 that at ratios approaching Nb1 and Nb2, the amount of reaction-branch power flowing through variable-ratio device 26 and thus its internal losses, are greatly diminished, corresponding to a very high overall efficiency approaching 100%. Curves 48 and 50 indicate regions beyond Nb1 and Nb2, which require the variable ratio device 26 to accomodate rotation reversal of shaft 30 at Nb1 and of shaft 32 at Nb2, providing a total range from Nmin to Nmax where the reaction power flow never exceeds the midpoint value of curve 50, in this case 17.1%. Since curves 48 and 50 are in a power-regenerative operating region, operation of the transmission beyond the limits indicated would further increase the reaction power flow level as indicated by the dashed curves.

It has been calculated that for this example, Nmin=2.61 and Nmax=6.91, thus the range of the variable transmission ratio, Nmax/Nmin, is 2.65.

For comparison, the maximum ratio ranges of conventional transmission configurations have been calculated using the same maximum reaction power flow level of 17.1%, as follows:

(a) a basic split-input or split-output subsystem would have a range of 1.4, (b) a single-planetary reaction-switched split-input/-split-output non-regenerative system such as in the Waring patent would have a range of 1.44, and (c) a dual-planetary reaction-switched system such as in the Miyao patent, with optimal selection of Nb1/Nb2, would have a range of 2.0.

The tradeoff between relative reaction power flow and ratio range is seen in FIG. 4 where transmission configurations (a), (b) and (c) as identified above are characterized in curves 52, 54 and 56 respectively, and the balanced reaction configuration of this invention is characterized in curve 58, which shows that a ratio range of over 9 may be achieved provided the variable-ratio device 26 can handle a maximum of 38% of the input power.

Figure 5:
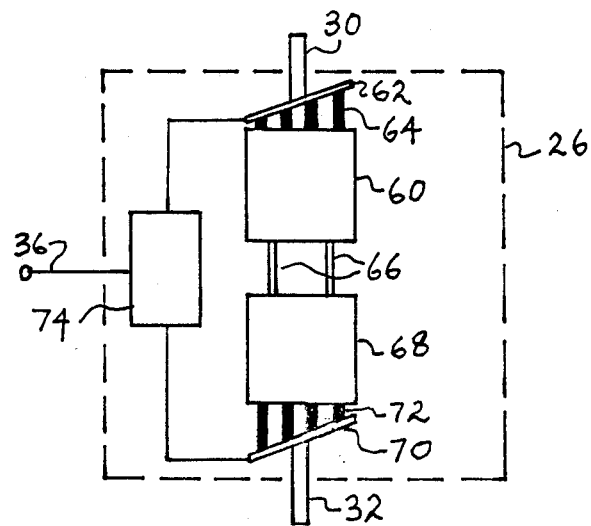
FIG. 5 is a block diagram of an auxiliary variable-ratio power-transfer device of the conventional hydraulic drive type utilizing a pair of fluid-coupled variable-stroke motor-pumps.

Turning now to FIG. 5, this block diagram shows the key elements of a well-known type of hydraulic drive which may be utilized as the auxiliary variable-ratio power-transfer device 26 of the illustrative embodiment shown in FIG. 1 and FIG. 2, as well as in other embodiments of the present invention.

The variable-ratio device 26 comprises a first hydromechanical motor-pump 60 comprising a first shaft 30 fitted with an adjustable swashplate 62 actuating a circular bank of internal pistons through push rods 64. Motor-pump 60 is hydraulicly coupled through a pair of fluid lines 66 to a second identical motor-pump 68 comprising shaft 32, swashplate 70 and piston push rods 72. One of the fluid lines 66 serves as a pressure line to transmit power while the other serves as an exhaust return line, so that either motor-pump 60 or 68 may serve as a pump, receiving mechanical power input at its shaft, while the other one serves as a motor delivering at its shaft an equal amount of power minus any internal losses. The angle of each swashplate on its shaft is adjustable to vary the stroke and displacement of each motor-pump, as regulated by a control unit 74 which is commanded at input 36.

The mechanism for receiving the control input and translating it into an appropriate angular position for each swashplate is readily implemented in the form of mechanical levers, but may be implemented hydraulicly or electricly in more sophisticated systems. Additional control mode range is available by by-passing or otherwise manipulating control lines 66 by means of fluid valves.

It should be understood that the utility and advantages of the balanced-reaction variable-ratio transmission of this invention are not contingent on the utilization of any particular type or configuration of the auxiliary variable-ratio device 26, and that numerous alternative variable-ratio power-transfer devices would be viable. Almost any available type of variable-ratio hydraulic drive would be adaptable, subject to applicable speed, torque, power, and fluid pressure requirement/capability considerations. Also, a variable-ratio mechanical drive could be utilized; for example there has considerable development of the type using a pair of belt-coupled, adjustable drive-diameter pulleys. An electronically-controlled electrical motor-generator device could also be utilized, subject to size/weight/power constraints.

Figure 6:
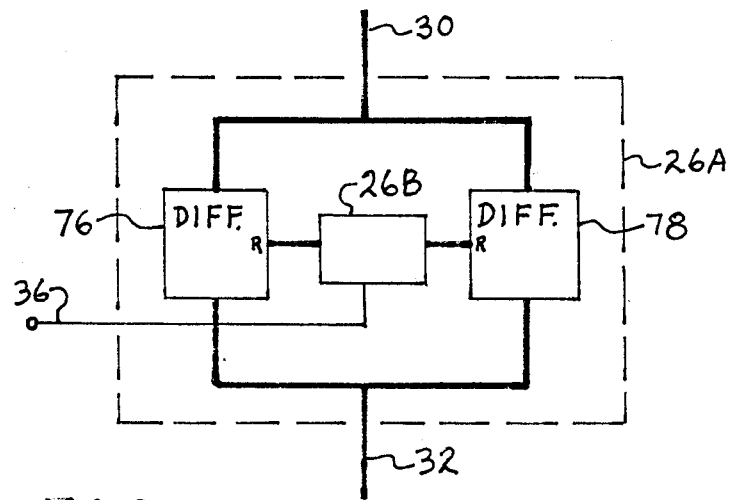
FIG. 6 is a block diagram showing a balanced-reaction differential gear configuration in an embodiment of the present invention as applied to boost the power-handling capacity of an auxiliary variable-ratio power-transfer device.

A method of utilizing the balanced-reaction principle to further reduce the reaction branch power flow level is shown in the block diagram of FIG. 6, where the auxiliary power-transfer device 26A further comprises a pair of differential units 76 and 78 in parallel power flow paths between shafts 30 and 32 which in turn would be coupled to reactors of a transmission as in FIG. 1. The reactors of differential units 76 and 78 are cross-coupled through an auxiliary variable-ratio device 26B, which corresponds to such devices already described, except that a significant reduction in its power-handling requirement is now accomplished by virtue of the buffering action of differential units 76 and 78 in this configuration, which in effect introduces an additional stage of balanced-reaction variable-ratio power transmission in a further embodiment extending the principles of the present invention. This enables an even wider ratio range to be designed into the transmission within the limitation of given variable-ratio device capabilities, or else the reduced power flow can permit scaling down the size, weight and/or cost of the variable-ratio device 26b, opening new possibilities of alternative types of variable-speed devices, since the balanced-reaction transmission principle may be successfully implemented utilizing any one of a variety of different known types of auxiliary variable-ratio power transfer devices.

Many equally advantageous alternative embodiments of the balanced-reaction principle of this invention are readily derived in addition to those described herein as illustrative. For example, in the embodiment of FIG. 2, it would be equivalent to attain the desired difference in base ratios by interposing gear ratio means at the input or output gear element of one of the two planetary sets, so that the two planetary sets themselves would not require different base ratios.

The differential gear unit, having three gear elements, offers a choice of six different input/reaction/output configurations, any of which may be chosen in conjunction with a selected gear size ratio for either of the two differential gear units 14 and 22 of FIG. 1, thus a designer has great flexibility to implement the present invention in a variety of different beneficial embodiments, combinations and configurations optimized to meet particular cost/performance/producibility requirements.

In an important embodiment of this invention, three or more differential gear units such as planetary gear sets may be configured in parallel with each other to form multiple power paths between the input and output shaft, each having an auxiliary variable-ratio bilateral power transfer device such as a single hydrostatic motor/pump coupled to its reactor. All of the variable-ratio devices would be interconnected to a flow control unit through their fluid lines, and controlled so as to select the pair of planetaries having base ratios closest to the required ratio and then operate them in the same manner as the dual-planetary balanced-reaction transmission described herein while allowing the reactors of unused planetary sets to rotate freely, unloaded; thus the utility of the present invention and all its advantages may be further extended to achieve a very wide range of ratios and other benefits.

Figure 7:
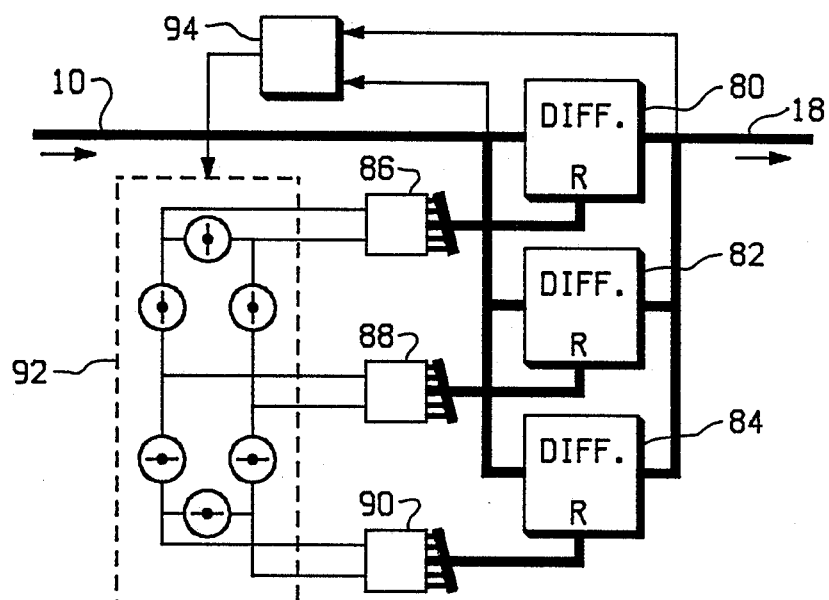
FIG. 7 is a block diagram showing three differential gear units configured as a two-range hydraulically-switched-balanced-reaction transmission system.

FIG. 7 is a block diagram of such a hydraulically-switched-balanced-reaction system having three differential gear units 80, 82 and 84, (in ascending order of base ratios) each connected to provide a power path between input shaft 10 and output shaft 18. Each differential reactor is rotationally coupled to single motor/pump unit: 86, 88 and 90, respectively. All six hydraulic lines from the three motor/pumps are connected to hydraulic valve controller 92, which, as commanded by ratio sensor 94 depending on the overall transmission speed ratio calculated from sensing input shaft 10 and output shaft 18, can select either of two ranges. The diagram shows a condition where the transmission speed ratio is less than the base ratio of differential 82; accordingly sensor 94 commands the valve settings shown in controller 92 so as to hydraulically couple pump/motor 86 to pump/motor 88 and thus select differentials 80 and 82 as the two active power paths; if sensor 94 senses a ratio greater than the base ratio of differential 82, then it commands controller 92 to reverse all six valve settings so as to hydraulically couple pump/motor 88 to pump/motor 90 and thus select differentials 82 and 84 as the two active power paths. At the transition during range switching, the transmission speed ratio is equal to the base ratio of transmission 82, therefore its reactor will be at zero rotation velocity.

Figure 8:
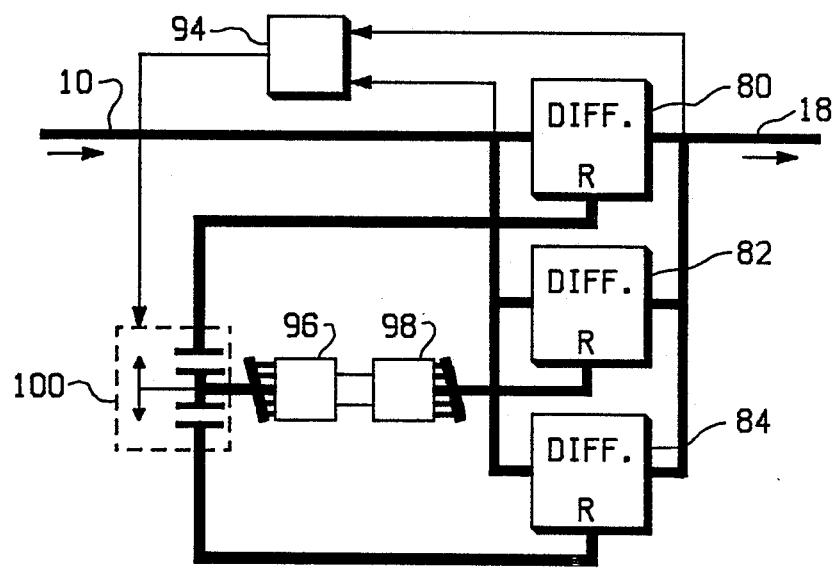
FIG. 8 is a block diagram showing three differential gear units configured as a two-range clutch-switched-balanced-reaction transmission system.

An alternative multi-differential parallel configuration requiring only a single conventional variable-ratio power-transfer device utilizes clutch means adapted to switch its two shafts to the reactors of two of the differentials selected by range selection control means as having the closest base ratios above and below the desired transmission ratio. The block diagram of FIG. 8 illustrates such a balanced-reaction-path-clutch-switched system having three differential units 80, 82 and 84 configured in parallel. Differential unit 82 has its reactor coupled to one shaft of the variable-ratio device at pump/motor 96 while its other shaft, at pump/motor 98, is made clutch-switchable between the other two reactors through dual clutch controller 100 as commanded by ratio sensor 94 providing two ranges having a total range equal to their multiplication product.

All such embodiments, variations, adaptations and substitutions which may become apparent to those in the art without departing from the principles and spirit of the balanced-reaction variable-ratio transmission as disclosed and claimed herein are intended to be encompassed within the scope of the present invention.

What is claimed is:

1. A variable-ratio transmission comprising:

a rotary input shaft;

a rotary output shaft;

a first planetary differential gear set having a sun gear element rotationally coupled to said input shaft, a planet-carrier gear element rotationally coupled to said output shaft, and a ring reaction gear element, referred to henceforth as a reactor, rotatably disposed in concentric relation around said input shaft, a second planetary differential gear set having a sun gear element rotationally coupled to said input shaft, a planet-carrier gear element rotationally coupled to said output shaft, and a ring gear reactor rotatably disposed in concentric relation around said output shaft; and an auxiliary variable-ratio power-transfer device having a first driveshaft rotationally coupled to one of said reactors, a second driveshaft rotationally coupled to the other of said reactors, and control means adapted to enable said auxiliary power-transfer device to regulate bilateral power exchange and rotational speed ratio between said first driveshaft and said second driveshaft, wherein the base ratio, being the locked-reactor input/output rotational speed ratio, of said first differential gear set is made different than the base ratio of said second differential gear set, whereby said control means is enabled to vary the operating ratio of said transmission over a continuous working range extending at least between the base ratio of said first differential gear set and the base ratio of said second differential gear set.

2. The invention as in claim 1 wherein said auxiliary variable-ratio power-transfer device comprises:

a pair of variable-displacement hydrostatic motor-pumps interconnected with each other through closed hydrostatic conduit means, each of said motor-pumps having one of said two rotary driveshafts; and displacement control means associated with said motor-pumps, whereby one of said motor-pumps, operating as a pump, is enabled to receive power through its driveshaft from one of said reactors, at rotational speed and torque within a designated range, and to transmit substantially all of the received power hydrostatically to the other of said motor-pumps, which, operating as a motor, is enabled to transfer the power through its driveshaft to the other of said reactors, at a required rotational speed and torque, as regulated by said control means, whereby said transmission is enabled to operate at a desired overall transmission ratio, which may be varied by said control means.

3. A variable-ratio transmission comprising:

a rotary input shaft;

a rotary output shaft;

three or more differential gear units each having an input gear element rotationally coupled to said input shaft, an output gear element rotationally coupled to said output shaft, and a reactor, wherein said differential gear units are made to each have a different base ratio;

auxiliary variable-ratio power-transfer means, adapted to transfer power from a first selected one of said reactors to a second selected one of said reactors; and range selection means adapted to select that pair of differential gear units, containing said first and second reactors, whose base ratios are closest above and below a required transmission ratio;

whereby power may be transferred between said first and second reactors through said auxiliary power-transfer means, allowing all other reactors to rotate freely, whereby a balanced power exchange between a pair of said reactors, thus selected for each range, is enabled to vary the operating ratio of the transmission within a range between the base ratios of the corresponding two differential units having said pair of reactors, thus providing a total variable transmission range extending at least from the lowest to the highest base ratio amongst said differential gear units.

4. The invention as in claim 3 wherein said auxiliary variable-ratio power-transfer means comprises:

a plurality of power transducers, each one associated with a corresponding one of said differential gear units, and each power transducer having (a) first power-port means comprising a rotary shaft rotationally coupled to the reactor of the corresponding differential gear set, and (b) second power-port means associated in bilateral input-output power transfer relation with said first power-port means; and device-ratio control means, having a device-ratio command input port, adapted to regulate power flow at each of said first power-port means;

and wherein said range selection means comprises a master ratio command input port and command distribution means connected to each of said device-ratio command input ports and to said power-flow interconnection means, programmed to activate, in response to a ratio command, a cross-coupled power flow path through a selected interacting pair of said power transducers.

whereby said transmission is enabled to operate at high power efficiency, without range-clutches or brake-type dissipative loading, over a wide total range of operating ratios, encompassing the lowest and the highest of all of said base ratios, by routing a major portion of available power through the pair of differential gear sets selected as optimally efficient power paths for obtaining a desired working transmission ratio as commanded, while minimizing the power-flow level in said auxiliary variable-ratio power-transfer means.

5. The invention as in claim 4 wherein each of said power transducers comprises a variable-stroke hydrostatic motor-pump having a rotary shaft as its first power-port, an input/exhaust pair of hydraulic fluid passages forming its second power-port, and adjustable-angle swashplate means, coupled to said shaft, adapted to regulate the stroke of said motor-pump and thus regulate its fluid displacement in accordance with a device-ratio input command, and wherein said power flow interconnection means comprises a hydraulic fluid system of routing valves and conduit interconnecting said hydraulic fluid passages of a pair of said power transducers, as selected by said routing valves under control of said range selection means, thus forming a closed bilateral hydraulic power drive between said pair of power transducers.

6. The invention as in claim 3 wherein said range selection means comprises clutch means adapted to (a) rotationally couple a first rotary shaft of said power-transfer device to said first selected reactor, and (b) concurrently rotationally couple said second rotary shaft of said power-transfer device to said second selected reactor, while allowing all others of said reactors to rotate freely;

whereby a balanced power exchange between the pair of said reactors thus selected by said range selection means may be controlled so as to vary the operating ratio of the transmission within a range between the base ratios of the two corresponding differential units thus selected, and whereby said transmission is enabled to operate at high power efficiency over a wide continuous range of ratios, encompassing the lowest and the highest of said base ratios, by routing a major portion of the power through the pair of differential gear sets selected as optimally efficient power paths for a commanded transmission ratio, while minimizing the level of power flow through said auxiliary variable-ratio power-transfer means.

7. The invention as in claim 6 wherein said auxiliary variable-ratio power-transfer means comprise:

a pair of variable-displacement hydrostatic motor-pumps interconnected with each other through closed hydrostatic conduit means, each of said motor-pumps having one of said two rotary driveshafts; and displacement control means associated with said motor-pumps, whereby one of said motor-pumps, operating as a pump, is enabled to receive power through its driveshaft from one of said reactors, at rotational speed and torque within a designated range, and to transmit substantially all of the received power hydrostaticly to the other of said motor-pumps, which, operating as a motor, is enabled to transfer the power through its driveshaft to the other of said reactors, at a required rotational speed and torque, as regulated by said control means, so as to cause said transmission to operate at a desired overall transmission ratio, which may thus be varied by said control means.

8. The invention as in claim 3 comprising three differential gear units, wherein the first differential unit, having said first selected reactor, is made to have a base ratio falling between the base ratio of the second differential unit and the base ratio of the third differential unit, and wherein said variable-ratio power-transfer means has a first shaft rotationally coupled to said first selected reactor, and a second shaft rotationally coupled through clutch means selectably engaging either the reactor of said second or the reactor of said third differential gear unit, as selected by control means.

9. A continuously-variable transmission comprising:
a rotary input shaft;
a rotary output shaft;
a first and a second differential gear set each having an input gear element rotationally coupled to said input shaft, an output gear element rotationally coupled to said output shaft, and a reactor;
a third and a fourth differential gear set each having a first gear element rotationally coupled to said reactor of said first differential gear set, a second gear element rotationally coupled to said reactor of said second differential gear set, and a reactor;
an auxiliary variable-ratio power-transfer device having two rotary driveshafts, one of said driveshafts being rotationally coupled to said reactor of said third differential gear set, and the other of said driveshafts being rotationally coupled to said reactor of said fourth differential gear set;
whereby the input/output rotational speed ratio of said transmission may be varied by regulating power flow through said auxiliary variable-ratio power-transfer device in a power flow path between said reactor of said third differential gear set and said reactor of said fourth differential gear set.

10. The invention as in claim 9 wherein said auxiliary variable-ratio device comprises:

a pair of variable-displacement hydrostatic motor-pumps interconnected with each other through closed hydrostatic conduit means, each of said motor-pumps having one of said two rotary driveshafts; and displacement control means associated with said motor-pumps, whereby one of said motor-pumps, operating as a pump, is enabled to receive power through its driveshaft from one of said reactors, at a particular rotational speed and torque, and to transmit substantially all of the received power hydrostaticly to the other of said motor-pumps, which, operating as a motor, is enabled to transfer the power through its driveshaft to the other of said reactors, at a required rotational speed and torque, as regulated by said control means, so as to cause said transmission to operate at a desired overall transmission ratio, which may thus be varied by said control means.

11. The invention as in claim 9 wherein said variable control transmission means comprises:

a pair of variable-drive-diameter pulleys, each having a driveshaft;

belt means coupling said pulleys with each other; and control means enabling the effective belt drive diameter of said variable-drive-diameter pulleys to be varied in inverse relation to each other, thereby providing a range of variable ratio between the rotational speeds of said driveshafts, as regulated by said control means.

* * * * *